United States Patent
Ramachandran

(10) Patent No.: US 10,621,014 B1
(45) Date of Patent: Apr. 14, 2020

(54) DYNAMIC PROGRAM GENERATION IN EVENT-DRIVEN COMPUTING

(71) Applicant: AMAZON TECHNOLOGIES, INC., Seattle, WA (US)

(72) Inventor: Shankar Ramachandran, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 353 days.

(21) Appl. No.: 15/276,058

(22) Filed: Sep. 26, 2016

(51) Int. Cl.
*G06F 9/54* (2006.01)
*G06F 8/38* (2018.01)

(52) U.S. Cl.
CPC .............. *G06F 9/542* (2013.01); *G06F 8/38* (2013.01)

(58) Field of Classification Search
CPC .................................. G06F 9/542; G06F 8/38
See application file for complete search history.

(56) References Cited

U.S. PATENT DOCUMENTS

2012/0290959 A1* 11/2012 Quine ...................... G06F 8/34
715/765
2017/0102925 A1* 4/2017 Ali ............................ G06F 8/36

* cited by examiner

*Primary Examiner* — Brian W Wathen
*Assistant Examiner* — Kimberly L Jordan
(74) *Attorney, Agent, or Firm* — Blank Rome LLP

(57) ABSTRACT

A method for dynamic program generation includes instantiating a first event handler. The first event handler analyzes a received first request to perform a function. The function is not supported by the first event handler when the first request is received. The first event handler communicates with an application programming interface (API) manager that catalogs APIs to identify one or more of the APIs that perform at least a part of the function. The first event handler generates a program to call at least one of the one or more APIs and triggers instantiation of a second event handler. The second event handler executes the program to call at least one of the one or more APIs to perform the function.

20 Claims, 9 Drawing Sheets

DYNAMIC PROGRAM GENERATION IN EVENT-DRIVEN COMPUTING

BACKGROUND

Complex software applications may include millions of lines of computer code and require teams of engineers and programmers and substantial time (e.g.; years) to create, test and debug. Accordingly, reducing the time and resources dedicated to software development and maintenance time is an increasingly important goal for software engineers and developers.

Over time, a variety of approaches to reducing software development effort have been implemented. Automatic code generation is one conventional approach to reducing the time and resources needed to produce complex programming. Automatic code generation allows a programmer to specify a software program at a high level of abstraction, and based on the information and rules provided by the programmer, a code generation tool produces source code that is intended to provide high level language states directed to the functionality specified by the programmer. While automatic code generation and other conventional productivity enhancement tools may tend to reduce the effort applied to produce a program, relative to lower level programming methods, some degree of programmer direction of the tool is necessary to produce any new program functionality.

BRIEF DESCRIPTION OF THE DRAWINGS

For a detailed description of various examples, reference will now be made to the accompanying drawings in which.

DETAILED DESCRIPTION

Figure 1:
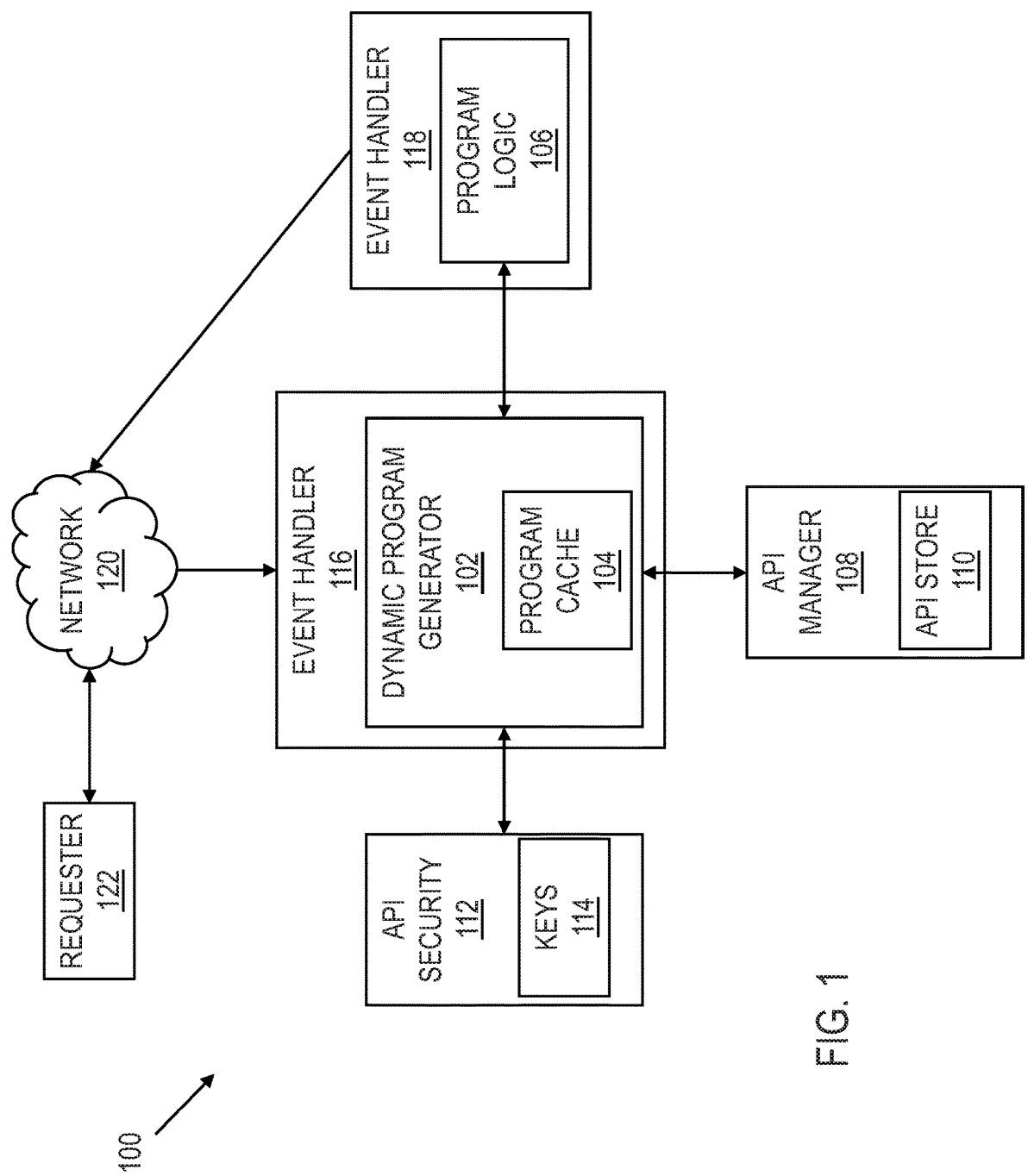
FIG. 1 shows a block diagram for a system for dynamically generating programming in accordance with various embodiments.

The present disclosure is directed to technologies for dynamically generating programming for execution by a computing system. More specifically, the systems and methods disclosed herein are directed to a computer executed dynamic program generator that autonomously generates programming to provide a specific function. In some embodiments, the specific function for which programming is to be generated may be communicated to the computing system in the form of a request. The dynamic program generator may be an event driven system that is instantiated, allocated, or launched to service the request. The dynamic program generator is configured to analyze a request for functionality, to identify parameters of the request that may be indicative of the functionality, and based on the parameters, to identify pre-existing programming that may provide the functionality.

On receipt of a request for specific functionality, the dynamic program generator analyzes the request to identify parameters of the request that may be relevant to the functionality and to identifying a pre-existing program that provides the functionality. The dynamic program generator builds a query that includes the parameters, and passes the query to an application program interface (API) manager. The API manager includes a catalog of APIs that can provide a variety of functionalities when called. The API manager identifies one or more APIs that may be relevant to the query and returns a response to the dynamic program generator that identifies the APIs. On receipt of the APIs, the dynamic program generator generates program code (e.g., scripts) to call each selected API with parameters appropriate to the API and to the received request, and activates an event handler in an event-driven system to execute the program code and call the APIs that will provide the requested functionality. The program code may also include information regarding a destination of results provided by a called API. For example, the program code may designate an address to which results provided by a called API are to be transmitted. The dynamic program generator provides the program code to the event handler, and the event handler executes the program code to call the API. The API returns a response to the event handler and the event handler forwards the response to a destination specified by the program code. In some embodiments, the event handler may return a result provided by the API to the dynamic program generator, and the dynamic program generator may forward the result to an appropriate destination address (e.g., an address from which the request originated).

In some embodiments, analysis of a request by the dynamic program generator may determine that more than one API must be called to satisfy a request. That is, the dynamic program generator may determine that the functionality needed to satisfy (i.e., fulfill) a request requires access to a number of APIs, where, for example, each successively called API provides a result based on information received from one or more previously called APIs. Accordingly, the dynamic program generator may construct multiple queries, where each of the queries is directed to identifying an API that may provide information relevant to satisfying the request. The program code generated by the dynamic program generator calls the APIs in a sequence intended to provide the functionality to satisfy the request.

The dynamic program generator may also determine that more than one API must be called to satisfy a request based on the input parameters of an API that provides functionality for satisfying a request. For example, a first API may produce a result directly satisfying a request, but requires specific input information. The dynamic program generator may construct a query to identify a second API that can provide the specific input information needed by the first API based on the information provided in the request.

In some embodiments, the dynamic program generator may also access an API security agent to obtain access to an API. For example, on receipt of information identifying an API as potentially providing functionality needed to satisfy a request, the dynamic program generator may communicate with an API security agent to gain access to the API. The API security agent may authenticate the dynamic program generator and provide to the dynamic program generator security keys and addressing information that allow the dynamic program generator to access the API.

To facilitate future access to functionality identified as satisfying a request, the dynamic program generator may include a cache that stores the program code generated to satisfy the request. The program code may be stored in the cache in association with parameters that allow the dynamic program generator to associate the program code with a specific request or requests, and in association with security keys that provide access to the APIs called by the program code. On receipt of a request, the dynamic program generator may access the cache to determine whether program code providing functionality satisfying the request has been previously generated. For example, the dynamic program generator may analyze the request and search the cache for parameters of the request identified by the analysis. If the dynamic program generator finds the parameters and associated program code in the cache, then the dynamic program generator may activate an event handler and provide the cached program code, with initial parameters derived from the request, to the event handler. The dynamic program generator may modify the program code read from the cache as needed. For example, the dynamic program generator may modify the code read from the cache to include an appropriate destination address and input parameters. The event handler executes the program code to call the APIs that provide functionality satisfying the request. The APIs return responses to the event handler and the event handler forwards a result to a destination specified by the program code.

On the other hand, if the dynamic program generator searches the cache and fails to identify program code directed to a received request, then the dynamic program generator may query the API manager for APIs that can be called to provide functionality needed to satisfy the request.

The dynamic program generator may also apply the cached program code to provide a portion of the functionality needed to satisfy a request, and query the API manager for APIs that can be called to provide additional functionality needed to satisfy the request. The dynamic program generator may generate new program code that incorporates the additional APIs and the previously cached program code to satisfy the request. The dynamic program generator stores the new program code in the cache for future use.

By applying the aforementioned techniques, the dynamic program generator may identify and apply functionality provided in the form of APIs and/or program code previously generated by the dynamic program generator to autonomously produce new program code without programmer direction. The new program code may be directed to solving a problem not previously encountered by the dynamic program generator, and which the dynamic program generator has not been specifically programmed to solve.

FIG. 1 shows block diagram for a system 100 for dynamically generating programming in accordance with various embodiments. The system 100 includes a first event handler 116, a second event handler 118, an API manager 108, and an API security agent 112. The event handler 116 and the event handler 118 communicate with a requester 122 via a network 120. The network 120 may be a local area network, a wide area network, the internet, or any other communication system. Communication between the event handler 118, the API manager 108 and the API security agent 112 may be via the network 120, a different network, or various other communication media. The requestor 122 may be a device, such as a computer-based device that is coupled to the network 120. The requester 122 provides requests for functionality to the event handler 116. For example, the requester 122 may be a computer terminal or other interface device that allows a user to communicate a request for functionality to the event handler 116.

The event handlers 116 and 118 may be transitory. That is, the event handlers 116 and 118 may be allocated to the system 100 only when the requester 122 transmits a request to be handled by the event handler 116, and only for the time duration necessary to satisfy the request. Accordingly, detection of a request for functionality may trigger allocation of the event handler 116 to the system 100, where allocation of the event handler 116 to the system 100 may include provisioning the event handler 116 with the request and software programming that processes the request.

The allocated event handler 116 includes a dynamic program generator 102 that, on receipt of a request for functionality, synthesizes programming that provides the requested functionality and triggers allocation of the event handler 118 to execute the synthesized programming. In FIG. 1, the event handler 118 has been allocated and provisioned with the program logic 106 synthesized by the dynamic program generator 102. The event handler 118 executes the program logic 106 and may return any result of the execution to a destination specified in the program logic 106.

The dynamic program generator 102 includes logic, in the form of software programming that analyzes each request for functionality received by the event handler 116. The analysis identifies parameters of the request that may be relevant to the requested functionality and to identifying programming that may provide the functionality. For example, the analysis of the request may apply linguistic analysis techniques to identify important features or parameters in the request, such as subject, predicate, etc. Request analysis identifies the focus of the request to determine what the request requires. Keywords may be extracted from the request using natural language or text processing tools. In some embodiments, a request received as a text stream may be tokenized to identify words, and a part of speech tagger applied to the words to identify nouns, verbs and modifiers that may be indicative of the meaning of the request. For example, on receipt of a request for "share price of company X," the words of the text string may be tokenized to identify each word. Thereafter, the part of speech tagger may assign a part of speech label to each word. The dynamic program generator 102 may select, for example, nouns of the request to include in one or more API identification queries.

The dynamic program generator 102 builds queries that include the identified important parameters of the request (e.g., the words of the request deemed most important, such as nouns) and applies the queries to identify programming that may satisfy the request. The construction of the queries may be dependent on the capabilities and requirements of the API Manager 108. For example, if the API manager 108 operates as an API search engine, then a query to the API Manager 108 may be constructed as nothing more than a call to a uniform resource locator for the API Manager 108 with parameters including a selection of words extracted from the request. Given a request for "share price of company X," the noun "price" and modifier "share" may presented to the API manager 108 as a query.

The system 100 includes an API manager 108. The API manager 108 includes an API store 110 that provides a catalog of APIs that provide a variety of functionality when called. The dynamic program generator 102 passes the queries to the API manager 108. The API manager 108 compares the parameters passed in each query to parameters of the various APIs recorded in the API store. For example, the API manager 108 may compare the parameters passed in a query to parameters of the various APIs to identify one or more APIs that may be relevant to the query. Comparison of the parameters passed in each query to parameters of the various APIs recorded in the API store may include accessing a database that stores the APIs, where the database is searchable using the request parameters. The API manager 108 returns a response to the dynamic program generator 102 that identifies the APIs that the API manager identified as most relevant to the query.

On receipt of API identification, the dynamic program generator 102 generates the program logic 106 to be executed to call the API with parameters appropriate to the API and parameters appropriate to the received request. For example, the dynamic program generator 102 may produce a script that calls the identified API with parameters extracted from the request. The dynamic program generator 102 may include an API call template to generate the script that calls the identified API. For example, if the API Manager 108 identifies an API destination as:

https://shareprice.com/xml, then the dynamic program generator 102 may insert the call to the API destination in a script template as:

'curl-get-include 'https://shareprice.com/xml' to call the API.

To execute the program logic 106, the dynamic program generator 102 triggers allocation of the event handler 118. Allocation of the event handler 118 may include provisioning the event handler 118 with the program logic 106. The event handler 118 executes the program logic 106 to call the API that will provide the functionality satisfying the request received from the requester 122. The called API returns a result to the event handler 118, and the event handler 118 may forward the result to a destination specified by the program logic 106. For example, the program logic 106 may designate an address to which results provided by the called API are to be transmitted. In some embodiments, the event handler 118 may return the result provided by the API to the event handler 116, and the event handler 116 may forward the result to an appropriate destination address (e.g., the address of the requester 122). In some embodiments, the program logic 122 may cause the event handler 122 to return the result provided by the API to a destination other than the event handler 116, e.g., the requester 122.

The dynamic program generator 102 may determine that the functionality needed to satisfy a request requires that more than one API be called. For example, a succession of API calls may be needed where one API supplies a result that is provided to a successively called API as an input value. Accordingly, the dynamic program generator 102 may construct multiple queries based on the parameters of the request, where each of the queries is directed to identifying an API that may provide information relevant to satisfying the request. The program logic 106 generated by the dynamic program generator 102 calls the APIs in a sequence that ensures that needed input information is available for each called API. For example, on receipt of a request for current share price of company X, the dynamic program generator may generate a first query to identify the ticker symbol for company X and second query to determine a current price of company X using the identified ticker symbol.

The dynamic program generator 102 may also determine that more than one API must be called to satisfy a request based on the input parameters of an API that provides functionality for satisfying a request. For example, a first API can produce a result ultimately satisfying a request, but requires specific input information. The dynamic program generator may construct a query to identify a second API that can provide the specific input information needed by the first API. Referring again to a request for the current share price of company X, if the dynamic program generator 102 generates a first query directed to determining share price, and the API manager 108 returns information regarding an API the determines share price using the ticker symbol as an input, then the dynamic program generator 102 may generate a second query directed to determining the ticker symbol for a company. When the dynamic program generator 102 has received information regarding both APIs, dynamic program generator 102 can synthesize the program logic 106 to first call the ticker symbol API and provide the result in a subsequent call to the share price API.

In some embodiments of the system 100, the APIs cataloged by the API manager 108 may require user authentication before access to an API is granted. In such embodiments, the dynamic program generator 102 may communicate with an API security agent 112 to obtain access to an API. The API security agent 112 includes keys 114 for an accessing an API and keys 114 may be provided to the dynamic program generator 102 on receipt, by the API security agent 112, of information authenticating the identity of the dynamic program generator 102. For example, on receipt of information identifying an API as potentially providing functionality needed to satisfy a request, the dynamic program generator 102 may communicate, to the API security agent 112, information identifying the API to which the dynamic program generator 102 needs access and information identifying the dynamic program generator 102. The API security agent 112 may verify the identity of the dynamic program generator 102 and provide the keys 114 to the dynamic program generator 102, thereby allowing the dynamic program generator 102 to access the API. When the dynamic program generator 102 has received information regarding the identified APIs and the security keys 114 associated with the APIs, the dynamic program generator 102 can synthesize the program logic 106 to call the APIs using the security keys 114. In some embodiments, the API security agent 112 may be incorporated in the API Manager 108.

Once the dynamic program generator 102 has produced program logic 106 to provide the functionality for satisfying a specific request, the dynamic program generator 102 may store the program logic 106, and information that ties the program logic 106 to the request, in the program cache 104. The program cache 104 may be a database or other storage system that allows the dynamic program generator 102 to identify the program logic 106 based on parameters associated with the program logic 106, such as parameters of a specific request that initiated generation of the program logic 106, or parameters of the APIs called by the program logic 106. In some embodiments of the system 100, the program cache 104 may be separate from and/or external to the event handler 116 to facilitate persistence of the program cache 104 while employing the transitory event handler 116.

On receipt of a request, the dynamic program generator 102 may analyze the request to identify request parameters and access the program cache 104 using the request parameters to determine whether program logic 106 providing functionality satisfying the request has been previously generated. For example, the dynamic program generator 102 may analyze the request to identify request parameters, generate a query including one or more of the request parameters, and pass the query to the program cache 104. The program cache 104 may execute the query to search for the request parameters. If the program cache 104 identifies program logic 106 associated with the request parameters, then the program cache 104 can return the program logic 106 to the dynamic program generator 102. Thereafter, the dynamic program generator 102 may modify the program logic 106 as needed to accommodate the new request. For example, the dynamic program generator 102 may insert a parameter derived from the new request into the program logic 106. Using the share price example, if the dynamic program generator 102 received a request for current share price of company Y, then the dynamic program generator 102 may insert "company Y" into the program logic 106 directed to determining a ticker symbol. The dynamic program generator 102 may also modify the program logic 106 retrieved from the program cache 104 to include an appropriate destination address for results of execution. The dynamic program generator 102 may activate an event handler 118 and provide the modified program logic 106 to the event handler 118. The event handler 118 executes the program logic 106 to call the APIs that provide functionality satisfying the request. The APIs return responses to the event handler 118 and the event handler 118 forwards a result to a destination specified by the program logic 106 (e.g., the requester 122 or the event handler 116).

If on receipt of a request, the dynamic program generator 102 queries the program cache 104, and the program cache 104 does not contain program logic 106 directed to the received request, then the dynamic program generator 102 may query the API manager 108 for APIs that can be called to provide functionality needed to satisfy the request.

Some embodiments of the dynamic program generator 102 may also apply the cached program logic 106 to provide a portion of the functionality needed to satisfy a request, and query the API manager 108 for APIs that can be called to provide additional functionality needed to satisfy the request. The dynamic program generator 102 may generate new program logic 106 that incorporates the additional APIs and the previously cached program logic 106 to satisfy the request. For example, if the dynamic program generator 102 receives a request for the current price of a share of company X, and a query of the program cache 104 identifies program logic 106 for determining the ticker symbol of a company, then the dynamic program generator 102 may incorporate the program logic 106 for determining the ticker symbol in a new program logic 106 that applies the ticker symbol to access an API that returns share price for a ticker symbol. The dynamic program generator 102 stores the new program logic 106 in the program cache 104 for future use.

Figure 2:
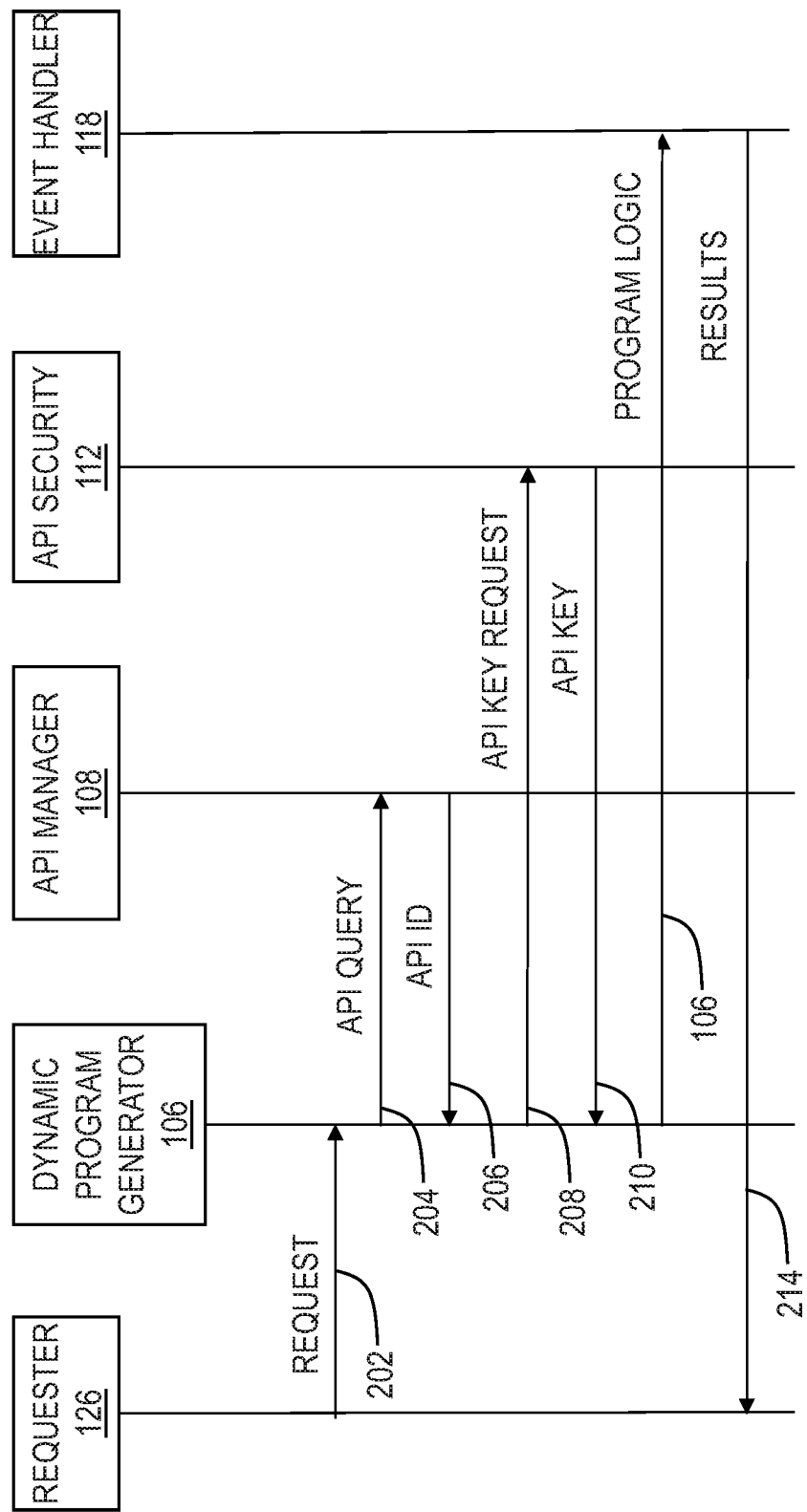
FIG. 2 shows communication in a system for dynamically generating programming in accordance with various embodiments.

FIG. 2 shows illustrative communication in a system for dynamically generating programming in accordance with various embodiments. Some embodiments may include more communication, less communication, or different communication than is shown in FIG. 2. The dynamic program generator 102 receives a request 202 from the requester 126. The request 202 may call for the provision of functionality by the dynamic program generator 102. At the time the request is received, the dynamic program generator 102 may not include programming that can provide the functionality. Responsive to receipt of the request 302, the dynamic program generator 102 may autonomously produce program logic 106 to provide the functionality.

The dynamic program generator 102 analyzes the request 202 to identify relevant parameters of the request 202 and the corresponding functionality satisfying the request. The dynamic program generator 102 may search the program cache 104 to determine whether program logic 106 corresponding to parameters of the request 202 is stored in the program cache 104. The program cache 104 may include a database or other searchable storage that stores the program logic 106 corresponding to different requests 202. If the program cache 104 does not contain program logic 106 corresponding to the parameters of the request 202, then the dynamic program generator 102 constructs a query 204 that includes the identified parameters of the request 202. The dynamic program generator 102 transmits the query 204 to the API manager 108. The API manager 108 applies the query 204 to search the API store 110, and identify one or more APIs related to the parameters of the request identified by the dynamic program generator 102. For example, the API store 110 may include a database, and the API manager 108 may query the database to identify, based on the query 204 and/or the parameters of the request 202 included in the query 204, one or more APIs that may provide functionality satisfying the request 202.

The API manager 108 returns identification (API ID 206) for one or more APIs, identified in the search of the API store 110, to the dynamic program generator 102. Authentication may be required to access the identified API. The dynamic program generator 102 communicates with the API security agent 112 to procure security keys for accessing the APIs. The dynamic program generator 102 may provide the API ID 206 and information identifying the dynamic program generator 102 to the API security agent 112 as API key request 208. Responsive to API key request 208, the API security agent 112 returns API key 210 to the dynamic program generator 102. API key 210 may allow the dynamic program generator 102 to access the API corresponding to the API ID 206.

The dynamic program generator 102 synthesizes program logic 106. Program logic 106 includes a call to the API identified by the API ID 206, the API key 210, API input parameters extracted from the request 202, API result destination, and other information needed for the API to satisfy the request 202. The dynamic program generator 102 may produce the program logic 106 in any of a variety of languages, for example, Python or Java. The dynamic program generator 102 triggers allocation of the event handler 118 and provides the program logic 106 to the event handler 118 for execution. The event handler 118 executes the program logic 106 to call the API and may return a result 214 of the execution to the requester 126. After execution of the program logic 106, the event handler 118 may be deallocated and returned to a pool of event handlers for later reallocation. Similarly, the event handler 116 may be deallocated and returned to a pool of event handlers for later reallocation.

Figure 3:
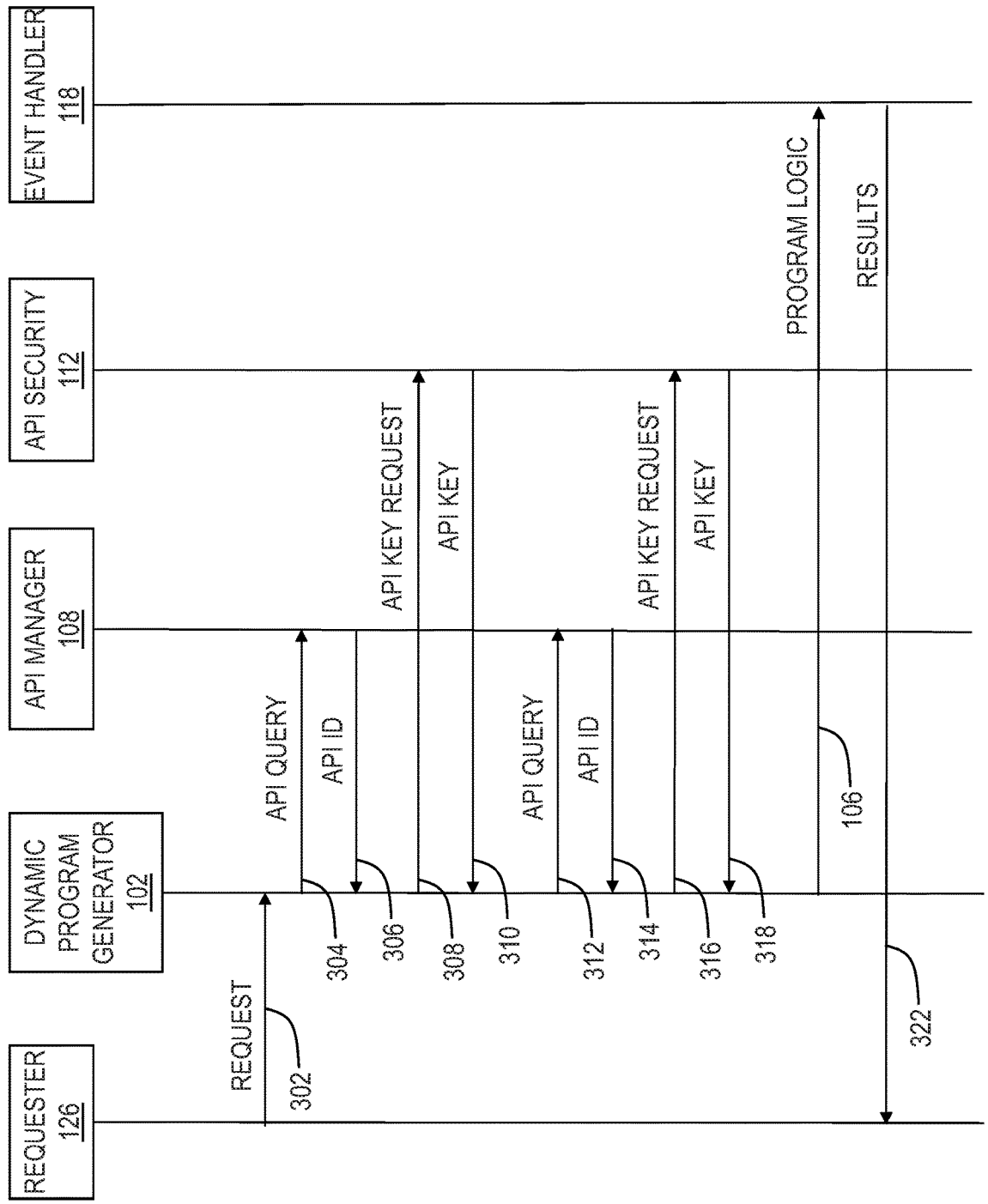
FIG. 3 shows communication in a system for dynamically generating programming in accordance with various embodiments.

FIG. 3 shows illustrative communication in a system for dynamically generating programming in accordance with various embodiments. Some embodiments may include more communication, less communication, or different communication than is shown in FIG. 3. The dynamic program generator 102 receives a request 302 from the requester 126. The request 302 may call for the provision of functionality by the dynamic program generator 102. At the time the request is received, the dynamic program generator 102 may not include programming that can provide the functionality. Responsive to receipt of the request 302, the dynamic program generator 102 may autonomously produce program logic 106 to provide the functionality, and trigger allocation of the event handler 118 to execute the program logic 106.

The dynamic program generator 102 analyzes the request 302 to identify relevant parameters of the request 302 and the corresponding functionality satisfying the request. The dynamic program generator 102 may search the program cache 104 to determine whether program logic 106 corresponding to parameters of the request 302 is stored in the program cache 104. The program cache 104 may include a database or other searchable storage that stores the program logic 106 corresponding to different requests 302. If the program cache 104 does not contain program logic 106 corresponding to the parameters of the request 302, then the dynamic program generator 102 constructs queries 304, 312 that include parameters for identifying APIs that provide functionality for satisfying the request 302. The parameters included in the queries may be derived from analysis of the request 302 or from the required input parameters of a previous query.

The dynamic program generator 102 transmits a first query 304 to the API manager 108. The API manager 108 applies the first query 304 to search the API store 110, and identify an API related to the parameters of the request 302 identified by the dynamic program generator 102. For example, the API store 110 may include a database, and the API manager 108 may query the database to identify, based on the query 304 and/or parameters of the request 302 included in the query 304, one or more APIs that may provide functionality satisfying the request 302.

The API manager 108 returns identification (API ID 306) for an API, identified in the search of the API store 110, to the dynamic program generator 102. Authentication may be required to access the identified API. The dynamic program generator 102 communicates with the API security agent 112 to procure security keys for accessing the API. The dynamic program generator 102 may provide the API ID 206 and information identifying the dynamic program generator 102 to the API security agent 112 as API key request 308. Responsive to API key request 308, the API security agent 112 returns API key 310 to the dynamic program generator 102.

In the transactions of FIG. 3, calls to multiple APIs are needed to provide functionality satisfying the request 302. Accordingly, after the dynamic program generator 102 receives the API ID 306 and/or the API key 310, the dynamic program generator 102 initiates a search for an additional API. The dynamic program generator 102 constructs a second query 312 that includes parameters for identifying the additional API. The parameters included in the second query may be derived from analysis of the request and/or from the required input parameters of the API corresponding to the API ID 306.

The dynamic program generator 102 transmits a second query 312 to the API manager 108. The API manager 108 applies the second query 312 to search the API store 110, and identify an API related to the parameters of the second query 312. For example, the API manager 108 may query a database of the API store 110 to identify, based on the query 312, one or more APIs that may provide functionality related to the query 312. An exemplary database of the API Store 110 may include for each API: API call information, such as a URL, tags to identify the subject matter or functionality of the API, response templates defining the information returned by the API and format thereof, and other information.

The API manager 108 returns identification (API ID 314) for an API, identified in the search of the API store 110, to the dynamic program generator 102. Authentication may be required to access the identified API. The dynamic program generator 102 communicates with the API security agent 112 to procure security keys for accessing the API. The dynamic program generator 102 may provide the API ID 314 and information identifying the dynamic program generator 102 to the API security agent 112 as API key request 316. Responsive to API key request 316, the API security agent 112 returns API key 318 to the dynamic program generator 102.

With the API IDs 306, 314 and the API keys 310, 318, the dynamic program generator 102 synthesizes program logic 106. Program logic 106 includes calls to the APIs identified by the API IDs 306, 314, and the API keys 310, 318 needed to access the APIs. API input parameters for the APIs identified by the API IDs 306, 314 extracted from the request 202 and/or a previously called API. For example, an input parameter to the API identified by the API ID 306 may be received as an output of the API identified by the API ID 314. The program logic 106 may also include a destination of a result of the API calls, and other information needed for the APIs to satisfy the request 302. The dynamic program generator 102 may produce the program logic 106 in any of a variety of languages, for example, Python or Java. The dynamic program generator 102 triggers allocation of the event handler 118 and provides the program logic 106 to the event handler 118 for execution. The event handler 118 executes the program logic 106 to call the APIs and may return a result 322 of the execution to the requester 126. After execution of the program logic 106, the event handler 118 may be deallocated and returned to a pool of event handlers for later reallocation.

Figure 4:
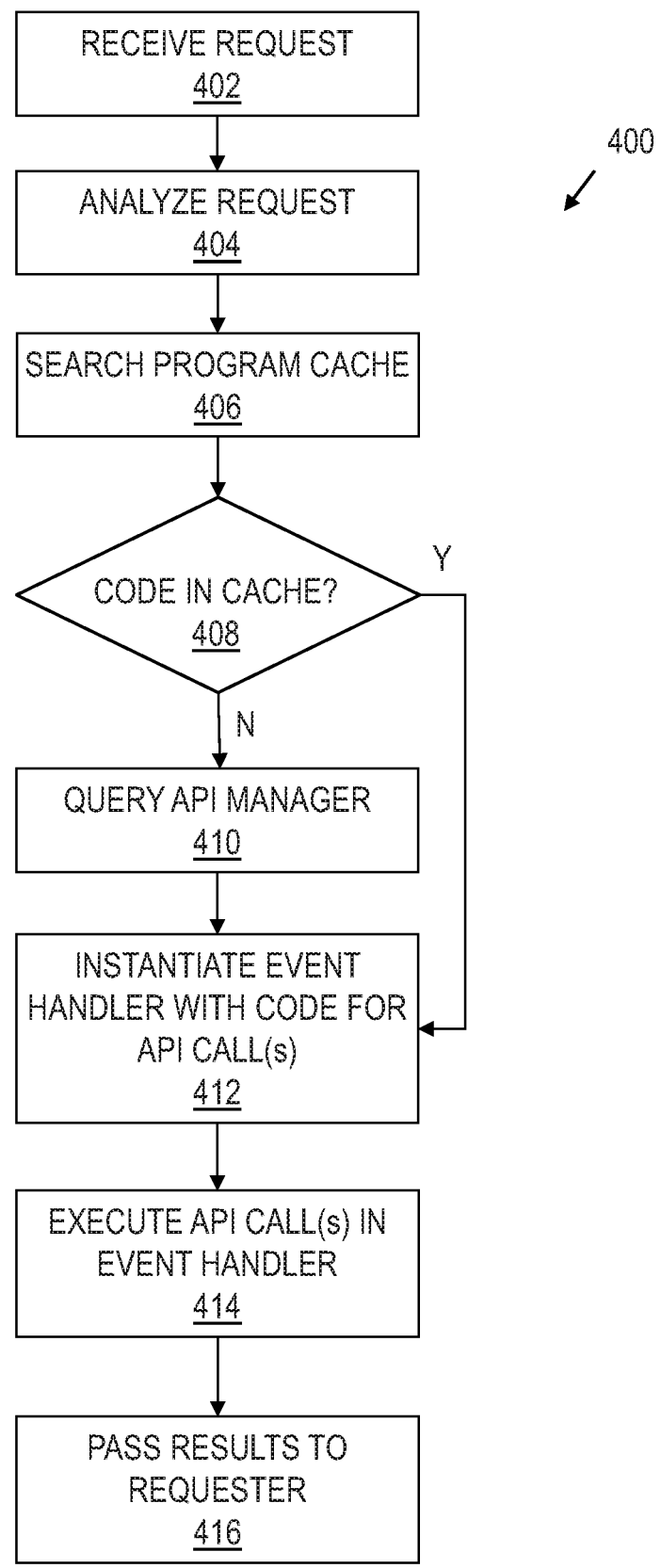
FIG. 4 shows a flow diagram for a method for dynamically generating programming in accordance with various embodiments.

FIG. 4 shows a flow diagram for a method 400 for dynamically generating programming in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400 may be provided by instructions executed by a computer as disclosed herein.

In block 402, the dynamic program generator 102 receives a request. The program generator 102 may be executed by a transitory event handler 116, and the request may be provided to the dynamic program generator 102 as parameter input provided with allocation and provisioning of the event handler 116 to process the request. The request may originate at the requester 122 and be transferred via the network 120. Satisfaction of the request may require that the dynamic program generator 102 provide functionality that is unknown to the dynamic program generator 102 at the time the request is received.

In block 404, the dynamic program generator 102 analyzes the request. Analyzing the request may include identifying parameters of the request that may be relevant to the functionality needed to satisfy the request. For example, the analyzing the request may include applying linguistic analysis techniques to identify important features in the request, such as subject, predicate, or other parts of speech.

In block 406, the dynamic program generator 102 searches the program cache 104 to determine whether program logic 106 relevant to the request has been previously synthesized. The dynamic program generator 102 may construct a query to be processed by the program cache 104 where, for example, the program cache 104 includes a database configured to process such a query. The query may include one or more terms extracted from the request. In some embodiments, the dynamic program generator 102 may search the program cache 104 directly for terms that match the terms extracted from the request.

If, in block 408, program logic 106 relevant to the request is identified in the program cache 104, then operation continues in block 412 with instantiation of an event handler 118 to execute the program logic 106 stored in the program cache 104. On the other hand, if the search of the program cache 104 fails to identify program logic 106 that is relevant to the request, then the dynamic program generator 102 queries the API manager 108 and synthesizes program logic 106 to satisfy the request using APIs provided by the API manager 108. Additional information regarding querying the API manager 108 is provided in FIG. 5 and associated text.

In block 412, having procured the program logic 106 (by synthesis or retrieval from the program cache 104) the dynamic program generator 102 triggers allocation of the event handler 118 to execute the program logic 106. For example, the dynamic program generator 102 may communicate with an event handler allocation system that allocates event handlers from a pool of available event handlers to cause the event handler 118 to be allocated for execution of the program logic 106. Allocation of the event handler 118 may include provisioning the event handler 118 with the program logic 106 to be executed.

In block 414, the event handler 118 executes the program logic 106. Execution of the program logic 106 includes calling the APIs that provide the functionality satisfying the request. The called APIs may be returned to the dynamic program generator 102 from the API manager 108.

In block 416, the event handler 118 passes results of the API calls to a destination identified by the program logic 106. For example, the program logic 106 may specify an internet protocol (IP) address to which results are to be transmitted. The IP address may specify the requester 122, the dynamic program generator 102, or other destination to receive the results.

Figure 5:
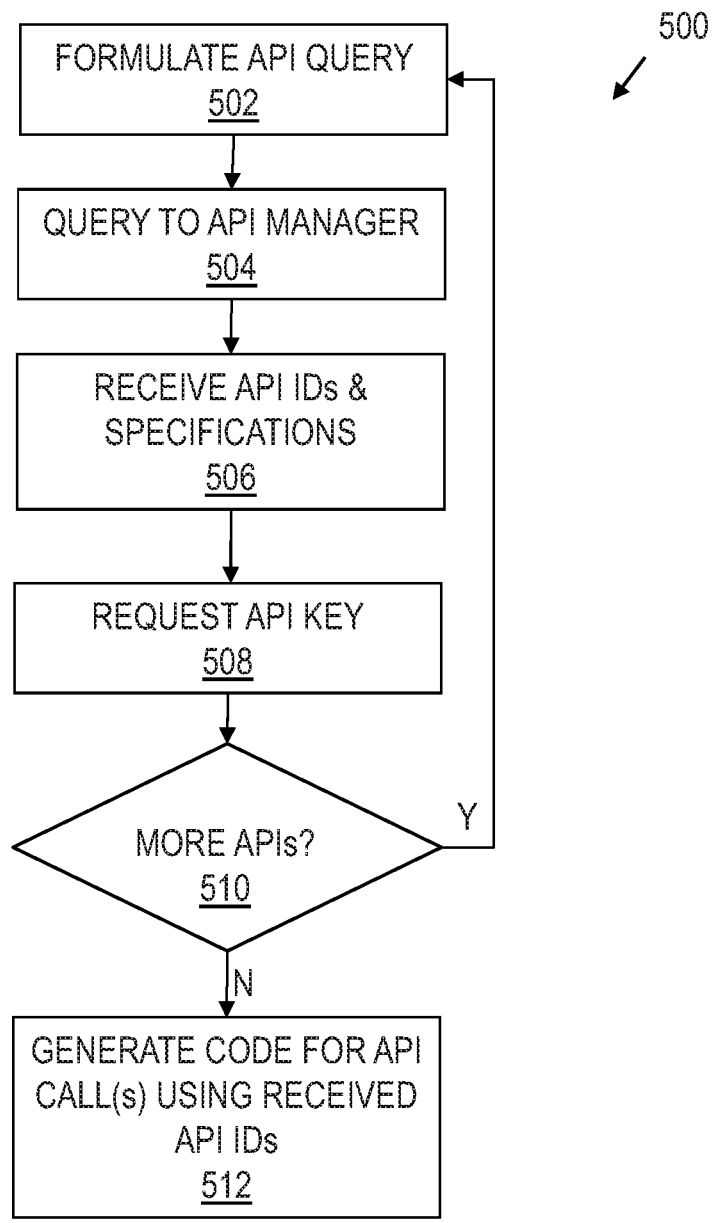
FIG. 5 shows a flow diagram for a method for identifying APIs as part of a method for dynamically generating programming in accordance with various embodiments.

FIG. 5 shows a flow diagram for a method 500 for identifying APIs as part of a method for dynamically generating code in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500 may be provided by instructions executed by a computer as disclosed herein. The operations of FIG. 5 may be provided as part of the operations of block 410 of FIG. 4.

In block 502, the dynamic program generator 102 formulates a query for the API manager 108. The query may be based on terms or other information that the dynamic program generator 102 extracted from the request received in block 402 of FIG. 4 via the analysis of block 404 of FIG. 4.

In block 504, the dynamic program generator 102 passes the query to the API manager 108 for processing. The API manager 108 identifies APIs that may be relevant to the query. For example, each API catalogued by the API manager 108 may be associated with key words that relate to the functionality provided by the API. If one or more of the key words associated with an API match a term provided in the query, then the API may be relevant to the query, and in turn relevant to providing functionality that satisfies the request. The API manager 108 returns identification information for one or more APIs identified as relevant to the query to the dynamic program generator 102. The API manager 108 may provide a relevance ranking value for each catalogued API identified as relevant to the query, return API identification in order of relevance, return identification only for an API deemed most relevant, etc. The API manager 504 may also provide specifications for the identified APIs, where the specifications identify the input parameters of the API and the results produced by the API. In block 506, the dynamic program generator 102 receives the API identification and specifications from the API manager 108.

For security reasons, access to an API may require that the call to the API provide a key. In block 508, the dynamic program generator 102 requests API keys for the APIs identified by the API manager 108. More specifically, the dynamic program generator 102 requests API keys for the APIs to be included in the program logic 106. The dynamic program generator 102 may communicate with the API security agent 112 to obtain a key to access an API. The dynamic program generator 102 may provide identification for an API and information identifying the dynamic program generator 102. In return, the API security agent 112 validates the identity of the dynamic program generator 102 and provides a key value to be used to access the API. In some embodiments, the API security agent 112 may provide additional information regarding the API, such as an address (e.g., a uniform resource locator) at which the API can be accessed.

In block 510, the dynamic program generator 102 determines whether additional APIs are to be called to provide functionality satisfying the request. For example, the analysis of block 404 of FIG. 4 may indicate that multiple API calls are needed to satisfy the request, or the specification of a first API received in block 508 may dictate that an additional API be called to provide an input parameter to the first API. If an additional API is needed, then the method continues in block 502 with formulation of an additional query to the API manager 108.

If, in block 510, the dynamic program generator 102 determines that all of the APIs needed to be satisfy the request have been identified, then in block 512, the dynamic program generator 102 produces programming, in the form of program logic 106, that can be executed by a computer to provide functionality satisfying the request. More specifically, the dynamic program generator 102 produces program logic 106 that can be executed by the event handler 118 to satisfy the request. For example, the dynamic program generator 102 may synthesize a script that that can be executed by the event handler 118. The script may include calls to the APIs identified by the API manager 108 and received from the API manager 108 in block 506, the API keys received from the API security agent 112, and parameters extracted from the request.

Figure 6:
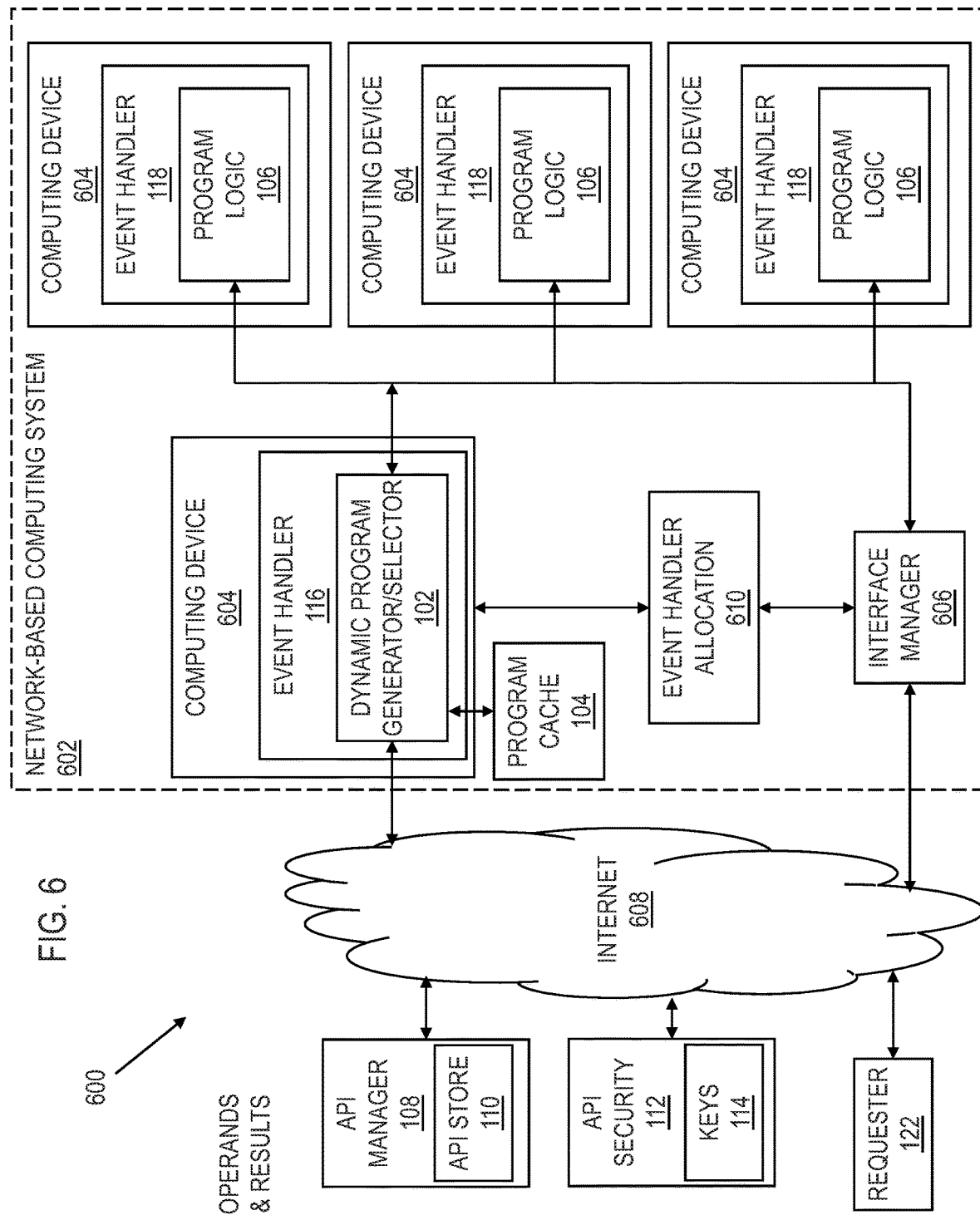
FIG. 6 shows a block diagram for a system for dynamically generating programming in a network-based computing system in accordance with various embodiments.

FIG. 6 shows a block diagram for a system 600 that dynamically generates programming in a network-based computing environment in accordance with various embodiments. The system 600 is an embodiment of the system 100 implemented using a network-based computing system. Network-based computing systems may be set up by an entity such as a company or a public sector organization to provide one or more services (such as various types of cloud-based computing or storage) accessible via the Internet and/or other networks to a distributed set of users. Such a computing system may include numerous data centers hosting various resource pools, such as collections of physical and/or virtualized computer servers, storage devices, networking equipment, event handlers, and the like, needed to implement and distribute the infrastructure and services offered by the provider. The resources may in some embodiments be offered to users in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In other embodiments, resources of the network-based computing system 602 may be offered to users as event handlers that provide a user selected amount of processor capacity, memory, or other computing resources. A number of different types of computing devices may be used singly or in combination to implement the resources of the computing system in different embodiments, including general purpose or special purpose computer servers, storage devices, network devices and the like. In some embodiments a user may be provided direct access to a computing resource, e.g., by giving a user an administrator login and password. In other embodiments the provider network operator may allow users to specify execution requirements for specified user applications, and schedule execution of the applications on behalf of the user on execution platforms (such as application server instances, Java™ virtual machines (JVMs), container-based systems, event handlers, general purpose or special-purpose operating systems, platforms that support various interpreted or compiled programming languages such as Ruby, Perl, Python, C, C++ and the like) suitable for the applications, without for example requiring the user to access an instance or an execution platform directly.

In some embodiments the provider network may be organized into a plurality of geographical regions, and each region may include one or more availability zones. An availability zone in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of computing resources is intended to be independent of the availability profile of a computing resource located in a different availability zone. Users may be able to protect their applications from failures at a single location by enabling use of computing resources in respective availability zones. At the same time, in some implementations, inexpensive and low latency network connectivity may be provided between computing resources that reside within the same geographical region (and network transmissions between resources of the same availability zone may be even faster).

Operators of such provider networks may in some instances implement a flexible set of resource reservation, control and access interfaces for their users. For example, a resource manager of the provider network may implement a programmatic resource selection/reservation interface (e.g., via a web site or a set of web pages) that allows users to learn about, select, purchase access to, and/or reserve computing resources. It is noted that in at least some of the various embodiments discussed herein, where an entity such as a resource manager is described as implementing one or more programmatic interfaces such as a web page or an API, an interface manager subcomponent of that entity may be responsible for the interface-related functionality. In many embodiments equivalent interface-related functionality may be implemented by a separate or standalone interface manager, external to the resource manager. Such an interface may include capabilities to allow browsing of a resource catalog, provide details and specifications of the different types or sizes of resources supported, the different reservation types or modes supported, pricing models, and so on.

The system 600 includes the network-based computing system 602 that implements the various elements of the system for dynamic program generation disclosed herein. The network-based computing system 602 interfaces to a requester 122 via the internet 608. The network-based computing system 602 is configured to provide an interface manager 606, an event handler allocation system 610, the program cache 104, and the event handlers 116 and 118. In the network-based computing system 602, the program cache 104 may be separate from the event handler 116 to facilitate persistence of the program logic 106 stored in the program cache 104 in conjunction with transience of the event handler 116. As shown in FIG. 6, the event handlers 116 and 118 are implemented on computing devices 604 which include physical host computers and may include virtual computing devices implemented as virtual machines or container-based virtual systems. In some embodiments, the network-based computing system 602 may include a pool of event handlers 116, 118 that are available for provisioning and allocation on receipt of a request by the interface manager 606 or the availability of program logic 106 for execution. The event handlers 116, 118 may, in some embodiments, be implemented in container-based systems that can be instantiated with low computational overhead and latency. In some embodiments, the event handlers 116, 118 may be provided via the LAMBDA service provided by AMAZON WEB SERVICES. The event handlers 116 and 118 may be transitory. That is, an event handler 116 may be allocated to process a specific request and deallocated responsive to completion of request processing. Similarly, an event handler 118 may be allocated responsive to the dynamic program generator 102 synthesizing program logic 106 for execution, and be deallocated responsive to completion of program logic 106 execution.

The interface manager 606 may, in some embodiments, receive requests transmitted by the requester 122 and/or other devices coupled to the network-based computing system 602 via the internet 608, or provided from request sources internal to the network-based computing system 602. Responsive to a received request, the interface manager 606 may trigger the event handler allocation system 610 to allocate an event handler 116 provisioned with the dynamic program generator 102. The requester 122 may be any of a variety of computing devices that provide for communication via the internet 608. For example, the requester 122 may be a desktop computer, a notebook computer, a tablet computer, a smart phone, etc. In some embodiments, the requester 122 may be implemented using and as part of the network-based computing system 602.

As explained with regard to the system 100, the event handler 116 executes the dynamic program generator 102, which generates, autonomously and without programmer interaction, program logic 106 and triggers allocation of an event handler 118 to execute the program logic 106.

The API manager 108 and the API security agent 112 operate as described with respect to the system 100. In some embodiments, the API manager 108 and/or the API security agent 112 may be external the network-based computing system 602 as shown in FIG. 6. In some embodiments, the API manager 108 and/or the API security agent 112 may be implemented using and as part of the network-based computing system 602.

Figure 7:
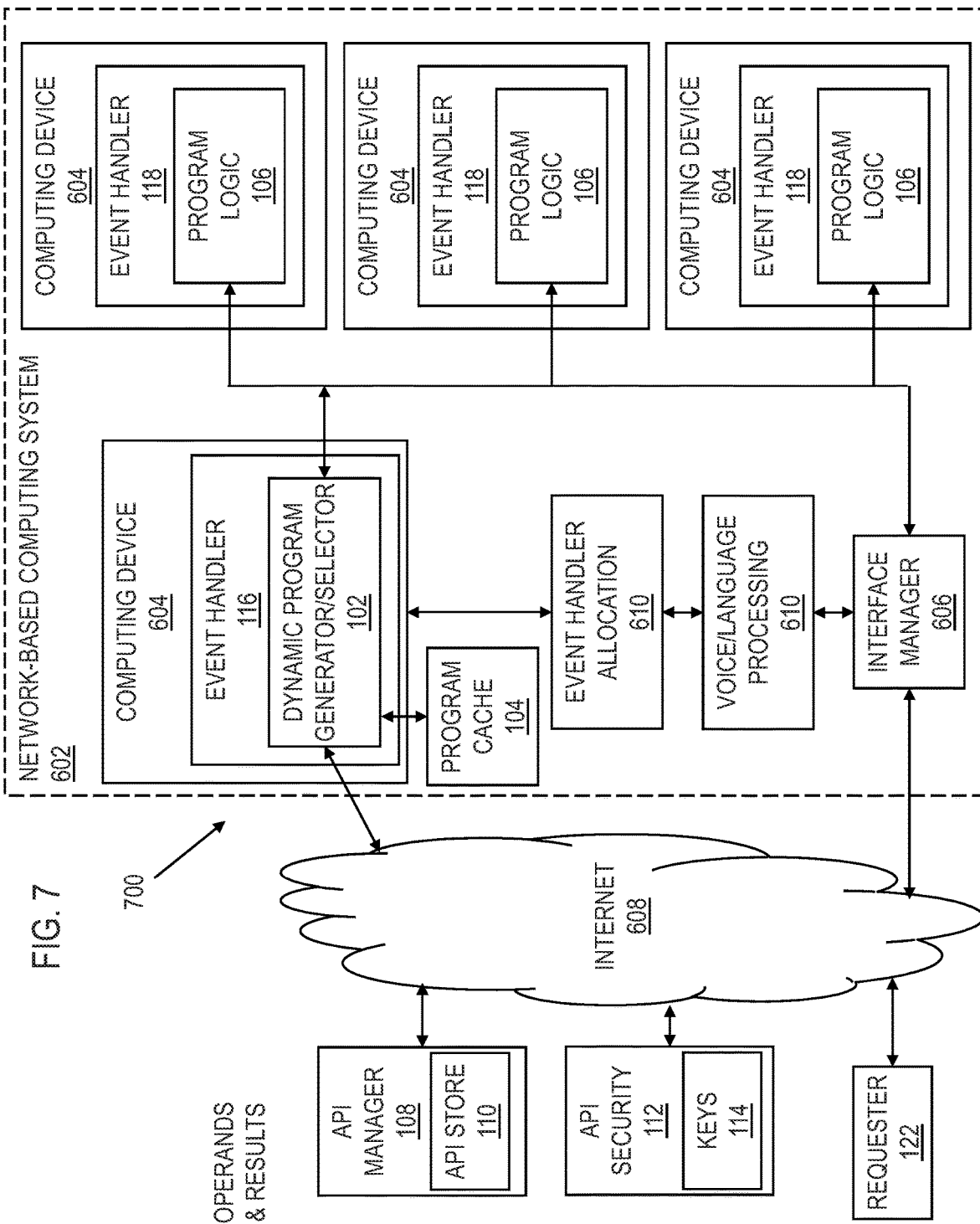
FIG. 7 shows a block diagram for a personal assistant system implemented with dynamic program generation in accordance with various embodiments.

FIG. 7 shows a block diagram for a personal assistant system 700 implemented with dynamic program generation in accordance with various embodiments. The system 700 is an application of the network-based computing system 602 to provide dynamic program generation in the context of a personal assistant. The system 700 includes the elements of the system 600 of FIG. 6 and adds the voice/language processing system 610. In the system 700, the requester 122 acquires and digitizes voice signals that represent a request. The digitized voice signals are transferred to the interface manager 606 via the internet 608. The interface manager 606 recognizes a request as voice signals based on identification information provided by the requester 122, and passes the digitized voice signals to the voice/language processing system 610. In some embodiments, the voice/language processing system 610 may execute in an event handler 118 and the interface manager 606 may trigger allocation of an event handler 118 to execute the voice/language processing system 610 on receipt of the digitized voice signals.

The voice/language processing system 610 includes speech recognition logic that converts the digitized voice signals to text. The voice/language processing system 610 may also include natural language processing logic that analyzes the text produced by the speech recognition logic. For example, the natural language processing may identify and tag various terms of the text as parts of speech that may be of value in determining the intent of the request. In embodiments of the system 700, the natural language processing logic may be provided as part of the voice/language processing system 610 or the dynamic program generator 102. Text data, part of speech tag data, and other data generated by the voice/language processing system 610 is passed to the dynamic program generator 102 for generation of programming that will satisfy the request received as digitized voice signals. In the case of the system 700, satisfying the request may include generating and executing program logic 106 that answers a question or performs a specific task (such as playing specified music, setting an alarm, etc.)

Figure 8:
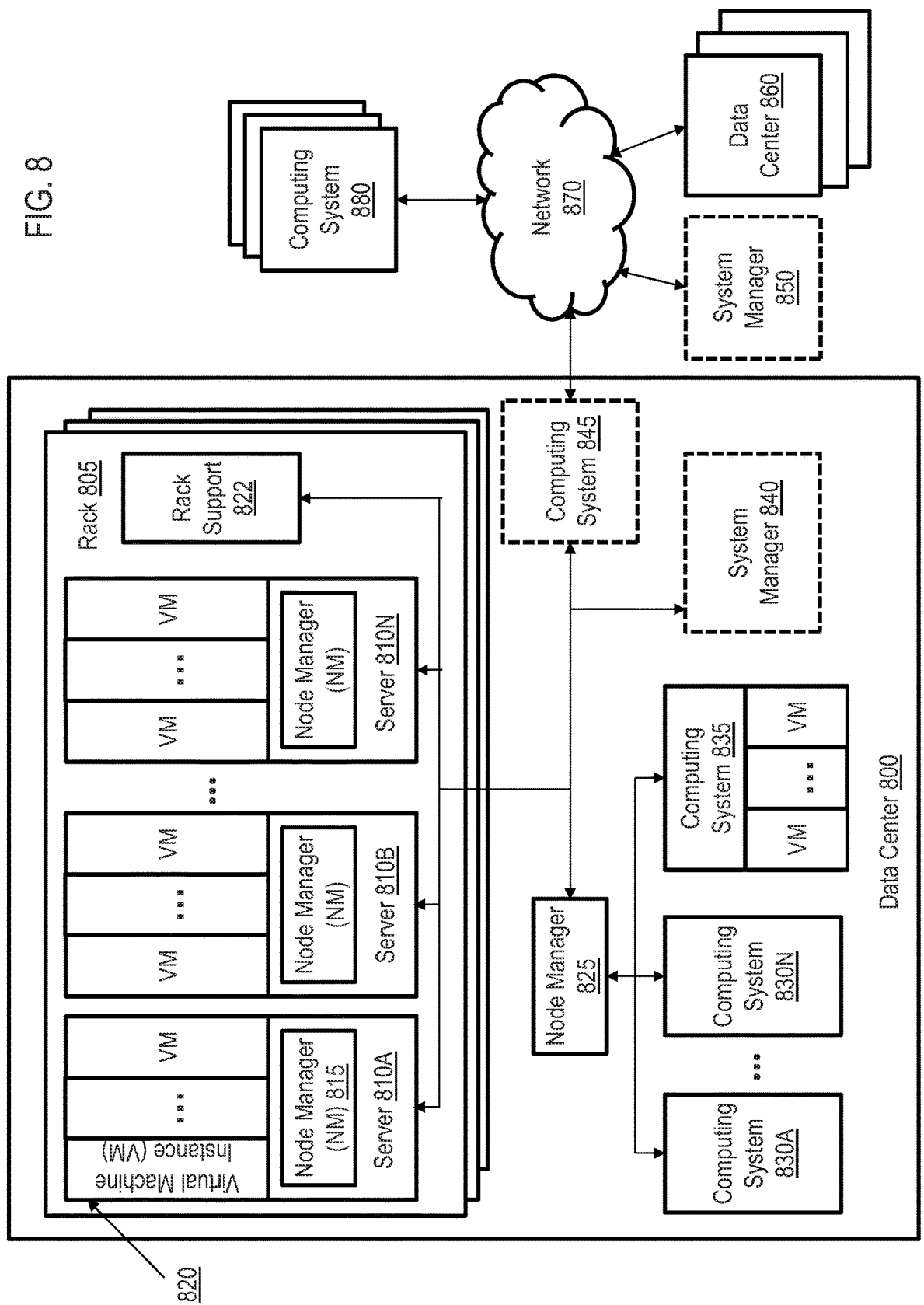
FIG. 8 shows a block diagram for a network-based computing environment suitable for implementation of a system for dynamically generating programming in accordance with various embodiments.

FIG. 8 shows a block diagram for a network-based computing environment suitable for implementation of dynamic program generation in accordance with various embodiments. In particular, in this example a program execution service manages the execution of programs on various computing systems located within a data center 800. Data center 800 includes a number of racks 805, and each rack includes a number of computing systems 810A-N, as well as a rack support computing system 822 in this example embodiment. The computing systems 810 each host one or more compute resources 820, which may be virtual machine instances or container-based systems 820 in this example, as well as a distinct node manager 815 to manage the compute resource. In this example, each compute resource 820 may be employed to provide an independent computing environment for executing a program. In this example, the rack support computing system 822 may provide various utility services for other computing systems local to the rack, as well as possibly to other computing systems located in the data center 800. The utility services may include, for example, data and/or program storage for other computing systems, execution of one or more machine manager modules to support other computing systems, etc. Each computing system 810 may alternatively have a distinct machine manager module (e.g., provided as part of the node manager for the computing system) and/or have local storage (not shown) to store local copies of programs. The computing systems 810 and the rack support computing system 822 all share a common data exchange medium in this example, and may all be part of a single group. This common data exchange medium may be connected to one or more external data exchange mediums shared by, for example, other racks or computing systems in the data center 800.

In addition, the example data center 800 further includes additional computing systems 830A-N and 835 that share a common data exchange medium with a node manager 825, and node manager 825 manages computing systems 830 and 835. In the illustrated example, computing system 835 also hosts a number of compute resources as execution environments for use in executing program instances for one or more users, while computing systems 830 do not host distinct compute resources. In this example, an optional computing system 845 resides at the interconnect between the data center 800 and an external network 870. The optional computing system 845 may provide a number of services such as acting as a network proxy, managing incoming and/or outgoing data transmissions, etc. Additionally, an optional system manager computing system 840 is also illustrated. The optional system manager computing system 840 may assist in managing the execution of programs on other computing systems located within the data center 800 (or optionally on computing systems located in one or more other data centers 860). The optional system manager computing system 840 may execute a system manager module. A system manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc.

In this example, the data center 800 is connected to a number of other systems via a network 870 (e.g., the Internet), including additional computing systems 880 that may be operated by the operator of the data center 800 or third parties such as users, additional data centers 860 that also may be operated by the operator of the data center 800 or third parties, and an optional system manager 850. In a manner similar to system manager 840, the system manager 850 may manage the execution of programs on computing systems located in one or more data centers 800 and/or 860, in addition to providing a variety of other services. Although the example system manager 850 is depicted as external to any particular data center, in other embodiments it may be located within a data center, such as one of the data centers 860.

Figure 9:
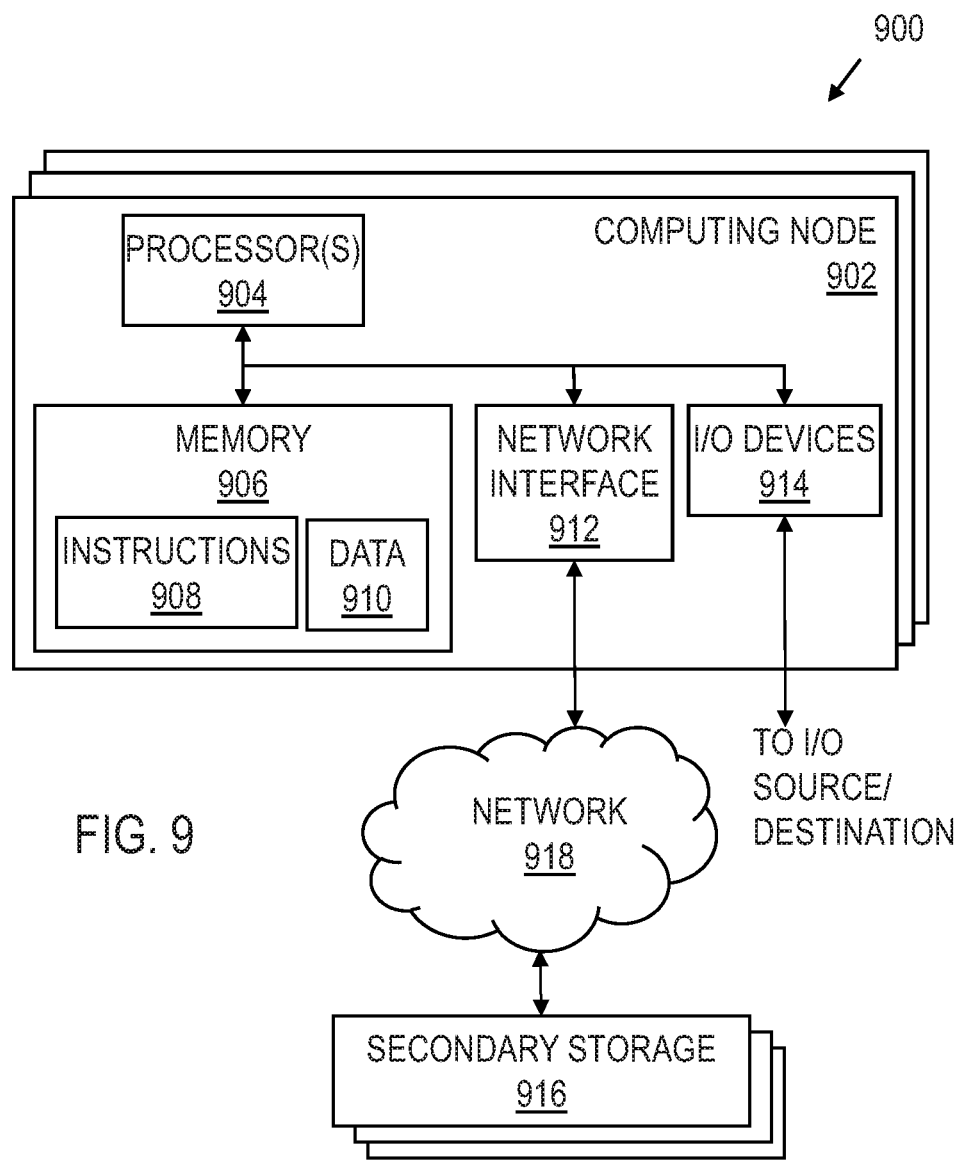
FIG. 9 shows a schematic diagram for a computing system suitable for implementation of a system for dynamically generating programming in accordance with various embodiments.

FIG. 9 shows a schematic diagram for a computing system suitable for implementation of a system for dynamically generating programming in accordance with various embodiments. For example, the system 100 of FIG. 1, the network-based computing environment of FIG. 8 and/or system 602 of FIG. 6 may be implemented via embodiments of the computing system 900. The computing system 900 includes one or more computing nodes 902 and secondary storage 916 that are communicatively coupled via a network 918. One or more of the computing nodes 902 and associated secondary storage 916 may be applied to provide the functionality of the network-based computing system 602, including the dynamic program generator 102, event handlers 116, 118, etc.

Each computing node 902 includes one or more processors 904 coupled to memory 906, network interface 912, and I/O devices 914. In some embodiments of the systems 100 and 600, a computing node 902 may implement the functionality of more than one component of the system. In various embodiments, a computing node 902 may be a uniprocessor system including one processor 904, or a multiprocessor system including several processors 904 (e.g., two, four, eight, or another suitable number). Processors 904 may be any suitable processor capable of executing instructions. For example, in various embodiments, processors 904 may be general-purpose or embedded microprocessors implementing any of a variety of instruction set architectures (ISAs), such as the x86, PowerPC, SPARC or MIPS ISAs, or any other suitable ISA. In e embodiments, the processors 904 may include special purpose processors or accelerators, such as one or more graphics processing unit (GPU), or hardware based accelerators, such gate arrays or programmable gate arrays configured to provide a predetermined processing function. In multiprocessor systems, each of processors 904 may commonly, but not necessarily, implement the same ISA. Similarly, in a distributed computing system such as one that collectively implements the network-based computing system 602, each of the computing nodes 902 may implement the same ISA, or individual computing nodes and/or replica groups of nodes may implement different ISAs.

The memory 906 may include a non-transitory, computer-readable storage medium configured to store program instructions 908 and/or data 910 accessible by processor(s) 904. The system memory 906 may be implemented using any suitable memory technology, such as static random access memory (SRAM), synchronous dynamic RAM (SDRAM), nonvolatile/Flash-type memory, or any other type of memory. Program instructions 908 and data 902 implementing the functionality disclosed herein are stored within system memory 906. For example, instructions 908 may include instructions that when executed by processor(s) 904 implement the dynamic program generator 102, the event handlers 116, 118, and/or other components of the network-based computing system 602 disclosed herein.

Secondary storage 916 may include volatile or non-volatile storage and storage devices for storing information such as program instructions and/or data as described herein for implementing the network-based computing system 602. The secondary storage may include various types of computer-readable media accessible by the computing nodes 902 via the network 918. A computer-readable medium may include storage media or memory media such as semiconductor storage, magnetic or optical media, e.g., disk or CD/DVD-ROM, or other storage technologies. Program instructions and data stored on the secondary storage 916 may be transmitted to a computing node 902 for execution by a processor 904 by transmission media or signals via the network 918, which may be a wired or wireless network or a combination thereof.

The network interface 912 may be configured to allow data to be exchanged between computing nodes 902 and/or other devices coupled to the network 918 (such as other computer systems, communication devices, input/output devices, or external storage devices). The network interface 912 may support communication via wired or wireless data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 914 may include one or more display terminals, keyboards, keypads, touchpads, scanning devices, voice or optical recognition devices, or any other devices suitable for entering or retrieving data by one or more computing nodes 902. Multiple input/output devices 914 may be present in a computing node 902 or may be distributed on various computing nodes 902 of the system 900, In some embodiments, similar input/output devices may be separate from computing node 902 and may interact with one or more computing nodes 902 of the systems 100 or 600 through a wired or wireless connection, such as over network interface 912.

Those skilled in the art will appreciate that computing system 900 is merely illustrative and is not intended to limit the scope of embodiments. In particular, the computing system 900 may include any combination of hardware or software that can perform the functions disclosed herein, including computers, network devices, Internet appliances, PDAs, wireless phones, pagers, etc. Computing node 902 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations y be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

Certain terms are used throughout the foregoing description and the following claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be based on Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for dynamic program generation in an event-driven computing system, the method comprising:
   receiving, by a first computing system, a first request to perform a function, wherein the first computing system lacks programming to perform the function;
   analyzing, by the first computing system, the first request to identify parameters of the function;
   generating, by the first computing system, a query based on the parameters of the function;
   passing, by the first computing system, the query to an application programming interface (API) manager that catalogs APIs;
   processing the query, in the API manager, to identify one or more selected APIs that perform at least a part of the function;
   receiving, by the first computing system, identification for the one or more selected APIs;
   generating, by the computing system, a program that is executable to call the one or more selected APIs; and
   executing the program to call at least one of the APIs to perform at least a part of the function.

2. The method of claim 1, further comprising:
   recording, by the first computing system, the program in a program cache;
   receiving, by the first computing system, a second request to perform the function;
   analyzing, by the first computing system, the second request to identify the parameters of the function;
   searching, by the first computing system, the program cache to determine whether programming corresponding to the parameters is recorded in the program cache;
   identifying, by the first computing system, the program recorded in the program cache; and
   executing the program to satisfy the second request.

3. The method of claim 1, wherein:
   wherein the analyzing, by the first computing system, the first request comprises:
      identifying a first parameter that is indicative of a first sub-function; and
      identifying a second parameter that is indicative of a second sub-function;
   wherein the generating, by the first computing system, the query comprises:
      generating a first query directed to the first parameter; and
      generating a second query directed to the second parameter;
   wherein the receiving, by the first computing system, identification comprises:
      receiving identification for a first API directed to the first sub-function; and
      receiving identification for a second API directed to the second sub-function;
   wherein the generating comprises:
      determining an order in which the first API and the second API are to be called to satisfy the first request; and
      arranging the program to call the first API and the second API in the determined order to satisfy the first request.

4. The method of claim 1, further comprising:
   responsive to receiving the identification, invoking a second computing system to perform the calling; and
   passing the program to the second computing system for execution.

5. A system, comprising:
   a plurality of computing devices configured to implement:
      a plurality of event handlers;
      wherein a first of the event handlers is programmed to:
         analyze a received first request to perform a function, wherein the function is not supported by the first event handler at a time that the first request is received;
         communicate with an application programming interface (API) manager that catalogs APIs to identify one or more of the APIs that perform at least a part of the function;
         generate a program that is executable to call at least one of the one or more identified APIs to perform at least a part of the function; and
         activate a second of the event handlers to execute the program.

6. The system of claim 5, wherein the first event handler is programmed to identify parameters of the function and pass the parameters to the API manager for identification of the one or more identified APIs.

7. The system of claim 5, further comprising:
   a program cache;
   wherein the first event handler is configured to record the program in the program cache.

8. The system of claim 7, wherein the first event handler is programmed to, on receipt of a second request to perform the function:
   access the program cache to identify the program;
   activate a different one of the event handlers to execute the program retrieved from the program cache to perform the function.

9. The system of claim 5, wherein the first event handler is programmed to:
   identify a first parameter that is indicative of a first sub-function to be performed as part of performance of the function; and
   identify a second parameter that is indicative of a second sub-function to be performed as part of performance of the function.

10. The system of claim 9, wherein the first event handler is programmed to:
    generate a first query directed to the first parameter;
    generate a second query directed to the second parameter; and
    transmit the first query and the second query to the API manager.

11. The system of claim 10, wherein the first event handler is programmed to:
    receive, from the API manager, identification for a first API, of the one or more of the APIs, directed to the first sub-function;
    receive, from the API manager, identification for a second API, of the one or more of the APIs, directed to the second sub-function;
    determine an order in which the first API and the second API are to be called to satisfy the first request; and
    arrange the program to call the first API and the second API in the order.

12. The system of claim 11, wherein the first event handler is programmed to:
    determine that a result provided by the first API is an input to the second API; and
    arrange the program to call the second API with the result provided by the first API as an input parameter.

13. The system of claim 11, wherein the first event handler is programmed to:
    retrieve, from an API security agent, a security key that authorizes access to the at least one of the one or more APIs; and
    apply the security key to access the at least one of the one or more APIs.

14. A method, comprising:
    invoking a first event handler;
    analyzing, by the first event handler, a received first request to perform a function, wherein the function is not supported by the first event handler at a time that the first request is received;
    communicating, by the first event handler, with an application programming interface (API) manager that catalogs APIs to identify one or more of the APIs that potentially perform at least a part of the function;
    generating a program to call at least one of the one or more APIs;
    triggering, by the first event handler, invocation of a second event handler; and
    executing, by the second event handler, the program to call at least one of the one or more APIs to perform the function.

15. The method of claim 14, further comprising:
    identifying, by the first event handler, parameters of the function; and
    passing, by the first event handler, the parameters to the API manager for identification of the one or more APIs.

16. The method of claim 14, further comprising recording, by the first event handler, the program in a program cache.

17. The method of claim 16, further comprising:
    receiving, by the first event handler, a second request to perform the function;
    accessing, by the first event handler, the program cache to identify the at least one of the one or more APIs;
    instantiating, by the first event handler, a different event handler;
    communicating information for calling the at least one of the one or more APIs retrieved from the program cache to the different event handler; and
    executing, by the different event handler, the program to call the at least one of the one or more APIs to perform the function.

18. The method of claim 14, wherein the analyzing comprises:
    identifying a first parameter that is indicative of a first sub-function to be performed as part of performance of the function; and
    identifying a second parameter that is indicative of a second sub-function to be performed as part of performance of the function.

19. The method of claim 18, further comprising:
    generating, by the first event handler, a first query directed to the first parameter;
    generating, by the first event handler, a second query directed to the second parameter; and
    transmitting, by the first event handler, the first query and the second query to the API manager;
    receiving, from the API manager, identification for a first API directed to the first sub-function;
    receiving, from the API manager, identification for a second API directed to the second sub-function;
    determining an order in which the first API and the second API are to be called to satisfy the first request; and
    arranging the program to call the first API and the second API in the order.

20. The method of claim 14, further comprising:
    retrieving, from an API security agent, a security key that authorizes access to the at least one of the one or more APIs; and
    applying the security key to access the at least one of the one or more APIs.

* * * * *